Figure 1:
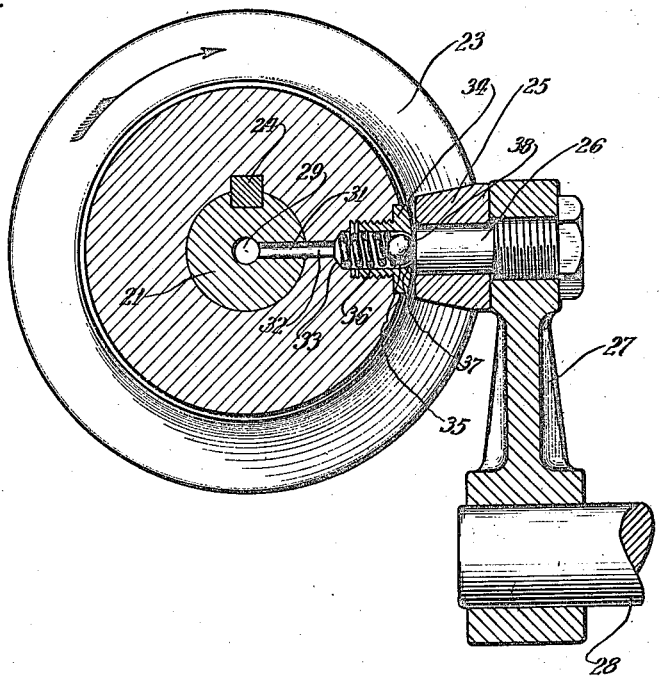

April 9, 1929.	M. E. WIDELL	1,708,164

CAM LUBRICATING MECHANISM

Filed March 23, 1925

INVENTOR
Magnus E. Widell
BY: Munday, Clarke
& Carpenter
ATTORNEY

Patented Apr. 9, 1929.

1,708,164

UNITED STATES PATENT OFFICE.

MAGNUS E. WIDELL, OF CINCINNATI, OHIO, ASSIGNOR TO AMERICAN CAN COMPANY, OF NEW YORK, N. Y., A CORPORATION OF NEW JERSEY.

CAM-LUBRICATING MECHANISM.

Application filed March 23, 1925. Serial No. 17,556.

My invention relates to lubricating mechanism and has for its primary object the provision of an automatically operating device for lubricating cams or like mechanical parts which cannot be readily reached by ordinary oiling or lubricating systems.

In the use of the well-known double wall or groove type of cam, in which a cam following roller is disposed in the cam groove and is actuated by the contour thereof, considerable difficulty has been experienced in providing the proper amount of lubricant to cause free action of the roller in said groove, particularly when the cams are so positioned that they cannot be reached by a splash oiling system, or the means used for lubricating other parts of the mechanism.

In accordance with my invention, a proper amount of lubricant is automatically supplied to the cam roller during rotation of the cam and applied by said roller to the groove, with the result that the cam mechanism is kept efficiently oiled at all times, the supply of lubricant being synchronized with the rate of rotation and so controlled as to effectively prevent excessive oiling.

Numerous other objects and advantages of the invention will be apparent as it is better understood from the following description, which, taken in connection with the accompanying drawings, discloses a preferred embodiment thereof.

Figure 2:
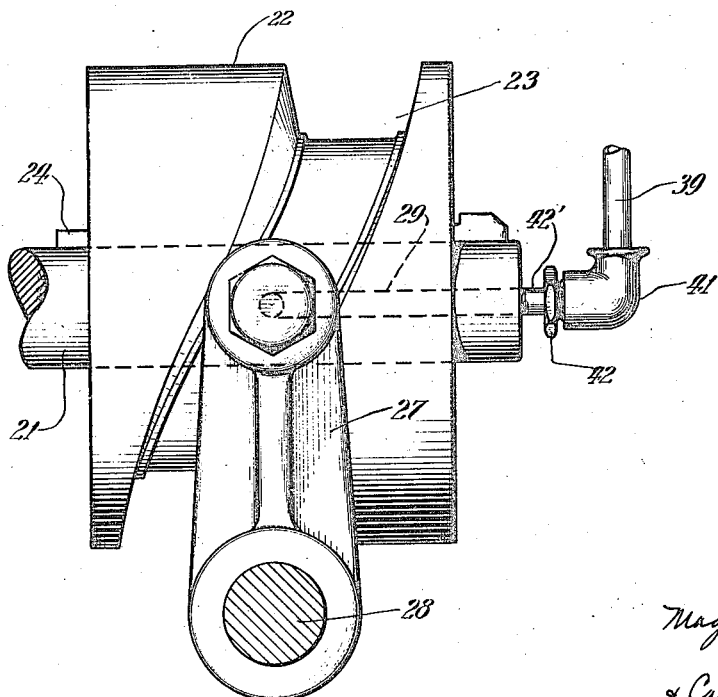

Referring to the drawings,

Figure 1 is a sectional view through a cam equipped with a device embodying my invention, the actuating lever and cam following roller being shown in position for operating the device; and Fig. 2 is an elevational view of said cam and associated parts.

On said drawings, illustrating the best manner in which I have thus far contemplated applying the principles of the invention, the reference character 21 indicates a drive shaft upon which is mounted a cam 22, having a cam groove 23 formed, in the present instance, in the circumferential face thereof, though it will be understood that the invention is equally applicable to other forms of cams, as, for example, those having the actuating groove in the side face thereof, or any other form of cam wherein the cam following roller is caused to pass successively over a given point in the cam track or where the cam is fixed and the roller is movable. The cam is secured to the shaft by means of a key 24 and a cam following roller 25 is disposed in the groove 23, said roller being mounted on a stud 26 extending through the end of a lever 27, which is mounted on a driven shaft 28. This mechanism is well known and commonly used for converting a rotary motion into a rocking or reciprocating motion and is described merely for the purpose of indicating the relationship in which the device of my invention is used.

A central bore 29 is provided in the shaft 21 and communicates with a radial bore 31 in said shaft registering with a radial bore 32 in the body of the cam, the latter being counter-bored near the periphery thereof, as indicated at 33. A valve cage member 34 is threaded into the counter bore and encloses a ball valve 35, normally held by means of a spring 36 against a valve seat 37 surrounding a valve opening 38 in the member 34. Said ball normally protrudes slightly beyond the face of the member 34, being held in this position by the spring 36 and by the pressure of the oil, or other lubricant which is provided in the bores 29, 31 and 32 and which may be either liquid or in the form of grease or hard oil. In the event that liquid oil is used, it may be supplied through a pipe 39, an elbow 41, a stuffing box 42 and a horizontal pipe 42', the source of supply being at a sufficient elevation to provide the desired pressure by gravity, or said pressure being provided by compressed air or gas, as desired. In the event that grease or hard oil is used, any suitable pressure means may be employed, the lubricant in either case being under sufficient pressure to cause it to pass out through the opening 38 when the ball valve 35 is unseated.

From the foregoing, the operation will be apparent. The cam, when rotating in the direction of the arrow in Fig. 1, periodically brings the extended ball 35 into contact with the roller 25 or pin 26 by which said ball is forced inwardly, a predetermined amount of lubricant being permitted to escape upon each contact with the roller 25 and being distributed about the cam groove by said roller 25. The cam is thus automatically lubricated with a sufficient but not excessive amount of lubricant to produce efficient operation.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The combination of a shaft having an axial oil duct, a cam-roller, a cam having a lubricant duct leading from said axial duct and provided with an opening in the bottom of the cam groove opposite the end of the roller, a valve adapted to close said opening and having a part adapted to encounter the roller, and a spring pressing the valve to closing position, whereby the roller from time to time opens the valve and receives lubricant through said opening to be distributed to the cam.

2. The combination of a cam engaging element, a grooved cam having a lubricant duct provided with an opening in the bottom of the cam groove, a ball-valve in the duct and movable a little beyond the opening to close the same, and a spring pressing the valve to closing position, whereby the end of the cam-engaging element may open the valve and from time to time receive lubricant from said opening, and a shaft having an axial duct and a radial continuation thereof which communicates with said duct of the cam.

MAGNUS E. WIDELL.